United States Patent [19]

Sueoka et al.

[11] 4,279,752

[45] Jul. 21, 1981

[54] POLYVINYL ALCOHOL SEMI-PERMEABLE MEMBRANE AND METHOD FOR PRODUCING SAME

[75] Inventors: Akinori Sueoka; Takehiko Okamoto; Akio Ohmori; Syuji Kawai; Minoru Ueda, all of Kurashiki, Japan

[73] Assignee: Kuraray Co., Ltd., Kurashiki, Japan

[21] Appl. No.: 41,077

[22] Filed: May 21, 1979

[30] Foreign Application Priority Data

May 25, 1978 [JP] Japan .................................. 53-63156

[51] Int. Cl.³ ...................... B01D 31/00; B01D 13/00
[52] U.S. Cl. .................................. 210/500.2; 264/49; 521/141
[58] Field of Search ..................... 521/141; 526/11, 29; 264/49; 106/122; 210/500 M, 321 A, 321 B, 321 R, 23 H, 23 F, 22, 490

[56] References Cited

U.S. PATENT DOCUMENTS

| | | | |
|---|---|---|---|
| 2,329,322 | 9/1943 | Baty et al. | 264/49 |
| 3,351,495 | 11/1967 | Larsen et al. | 264/49 X |
| 3,376,238 | 4/1968 | Gregorian et al. | 264/49 |
| 4,073,733 | 2/1978 | Yamauchi et al. | 521/141 X |
| 4,083,906 | 4/1978 | Schindler et al. | 264/49 |

*Primary Examiner*—Frank A. Spear, Jr.
*Attorney, Agent, or Firm*—Barry Kramer

[57] ABSTRACT

A polyvinyl alcohol (PVA) microporous membrane is disclosed which is prepared by a process which comprises forming a PVA membrane containing fine silica particles therein and substantially extracting said silica particles from said membrane, thereby forming a plurality of micropores therein with an average diameter of 0.01 to 50 microns and a porosity of at least 60%.

22 Claims, 4 Drawing Figures

POLYVINYL ALCOHOL SEMI-PERMEABLE MEMBRANE AND METHOD FOR PRODUCING SAME

BACKGROUND OF THE INVENTION

1. Field of the Invention

This invention relates to polyvinyl alcohol (PVA) membrane materials and a method of producing PVA membranes having a uniform, microporous structure and an improved permeability.

2. Description of the Prior Art

In recent years, porous membranes produced by various methods and intended for use in the separation of minute particles having sizes not greater than one micron by filtration have been reported. Such membranes have been produced by many different techniques, for example: membranes have been produced by dissolving a polymer in a mixture of a good solvent and a poor solvent for the polymer and casting the resulting mixture into a thin film; membranes have been produced by mixing a substance soluble in a polymer solution and thereafter extracting the substance from the resulting shaped article; membranes have been produced by sintering together a layer of polymer particles; and membranes have also been produced by stretching a film to form a fibrillated structure or microporous structure. These membranes, however, have both advantages and disadvantages which are attributable to the methods of formation thereof.

While PVA membranes for separation purposes have now become of interest due to special properties of the polymer especially the hydrophilic property thereof, porous PVA membranes have been rarely reported.

It is known that porous PVA sponge can be produced by mixing starch or dextrin together with formalin and an aqueous PVA solution, thereby causing formalization and at the same time swelling the starch or dextrin particles, and, after the formalization, removing the starch or dextrin by washing the product with water. The sponge prepared by this method, due to the method itself, exhibits pore sizes as large as several microns or more, generally more than 10 microns, and therefore is not suited for separation of more minute particles by filtration. Another drawback of the sponges prepared by this method is that they generally exhibit non-uniform pore size distributions. It is not possible to produce hollow fiber membranes by spinning the polymer solution because the formalization reaction mentioned above is effected over a fairly long period of time.

U.S. Pat. No. 4,073,733 discloses uniform, porous PVA membranes having specific micropores made by a process comprising dissolving a polyalkylene glycol (PAG) into a PVA aqueous solution, coagulating the resultant solution in a coagulation bath to form a membrane and, removing PAG by extraction during or after coagulation. The membranes obtained by this method have average pore sizes of 0.02-2 microns and show excellent performance in the separation of minute particles. It is not possible, however, to produce membranes having larger pore diameters by this method.

Thus, porous PVA membranes having relatively large pore sizes and relatively small pore sizes, respectively, are known and commercially available, but no method for producing membranes wherein the pore sizes can be varied, as desired, from large to very small has so far been provided. Today the demand for membranes has significantly increased and membrane performances are required to be suitable for widely different applications. Under these circumstances, there is a great need for membranes having a wide variety of pore sizes.

In addition to pore size, narrowness of pore size distribution is another important factor to the performance of porous membranes. The narrower the pore size distribution, the better the cutoff performance of the membranes. Good cutoff is desirable for membranes used in filtration applications.

As mentioned above, known porous PVA membranes having relatively large pore sizes do not show narrow pore size distribution and cannot be used in fine filtration applications; whereas known porous PVA membranes having relatively small pore sizes can still be improved in the narrowness of the particle size distribution, although they exhibit fairly good pore size distribution.

The present inventors have now found that excellent PVA membranes without any of above problems can be obtained by the method of the present invention.

SUMMARY OF THE INVENTION

This invention provides a polyvinyl alcohol (PVA) microporous membrane manufactured by a process which comprises preparing a PVA membrane containing fine silica particles therein and extracting at least 90% of said silica particles from the membrane thereby forming a uniform microporous layer which comprises a plurality of micropores with an average diameter (r) of 0.01 to 50 microns and exists in 100 to 20% of the whole thickness of the membrane and a supporting layer which comprises a plurality of vacuoles with an average longitudinal length (l) of more than 10 microns and exists in 0 to 80% of the whole thickness of the membrane, wherein ratio of l/r is at least 5 and the membrane has a porosity of at least 60%.

One feature of the membrane obtained in accordance with the present invention, is that the micropores are formed by incorporating fine silica particles into a PVA membrane followed by removal of said silica particles. Being an inorganic substance, unlike the organic substances such as starch and PAG mentioned above, silica particles have the advantage of uniformity of particle size and purity. In the case of the previously mentioned two materials for forming micropores, swelling in the solution or phase separation is utilized, and therefore the resulting microporous structure varies depending upon the conditions of preparation of the solution and membrane. This is undesirable for obtaining products of uniform quality. To the contrary, the fine silica particles used according to the present invention are stable against PVA and its solution. The particle size of silica can be easily controlled except for the case of controlling aggregation of fine silica particles, and uniformity of the resulting microporous structure is much improved.

The fine silica particles used in the present invention are colloidal silica which is a suspension in water, or fine silica particles with or without water of crystallization (hereinafter called silica powder). Various kinds of colloidal silica are available that have relatively uniform particle sizes in the range of about 0.005–0.1 micron, and they are incorporated into the PVA solution. When colloidal silica is dispersed in the solution and aggregation thereof is inhibited, micropores having sizes of about 0.01–1 micron, which roughly correspond to the particle sizes of colloidal silica, can be produced. When the dispersion is carried out under such conditions as can cause aggregation of colloidal silica, micropores of about 0.1-50 microns can be produced.

Silica powders available at present have uniform particle sizes within the range of about 0.005-10 microns. By incorporating these powders into the PVA solution, micropores of about 0.01-10 microns can be produced when aggregation of silica is inhibited and micropores of about 0.1-50 microns can be formed when aggregation of silica is allowed to proceed.

The membranes obtainable through the present invention consist essentially of micropores having an average pore size of 0.01 to 50 microns, and more preferably 0.05 to 20 microns. It is preferable for the membrane to have no dense layer on the surface thereof but it may have a dense layer where necessary.

It is one of the advantages of the present invention that microporous membranes having arbitrary pore sizes within the range of from 0.01-50 microns can be selectively produced by using solutions of the same composition containing PVA and silica particles.

The membrane according to the present invention has the microporous structure or layer in the membrane, which mostly governs water permeability and cutoff performance of the membrane, and can afford two kinds of membrane structures. One of them is what comprises a uniform microporous structure comprising a plurality of uniform micropores with an average diameter of 0.01 to 50 microns and has a porosity of at least 60%.

The other is what comprises a uniform microporous layer comprising a plurality of said micropores and existing in 80 to 20% of the whole thickness of the membrane and a supporting layer comprising a plurality of vacuoles with an average longitudinal length of more than 10 microns and existing in 20 to 80% of the whole thickness of the membrane, wherein ratio of the average longitudinal length (l) of vacuoles to the average diameter of micropores (r), i.e. l/r, is at least 5 and the membrane has a porosity of at least 60%.

The former structure of the membrane can be formed in any of shaped membranes such as flat membrane, tubular membrane and hollow fiber membrane, however, the latter structure is formed only in the hollow fiber membrane.

The supporting layer in the latter structure thins the thickness of the uniform microporous layer in the membrane. It therefore results in increase of water permeability, and further retains nearly the same mechanical strength as that of a microporous layer of the same thickness. The vacuoles in said supporting layer are formed into a concyclic shape in the cross-section of the hollow fiber and the longitudinal length thereof means a length of radial direction in the circular cross-section of the hollow fiber. The vacuoles have an average longitudinal length of more than 10 microns, which ranges in 80 to 20%, more preferably 80 to 40% of the whole thickness of the hollow fiber membrane.

The membrane having vacuoles with a longitudinal length of more than 80% of the whole thickness, has an inferior cutoff performance and mechanical strength, and the membrane having vacuoles with a longitudinal length of less than 20% of the whole thickness, hardly improves water permeability thereof. The ratio of l/r is at least 5, more preferably at least 10.

BRIEF DESCRIPTION OF THE DRAWINGS

The invention will become more apparent by referring to the drawing wherein

FIG. 3 shows a narrow pore-size distribution curve with a peak at 1.5 microns, indicating excellent cutoff performance.

DETAILED DESCRIPTION OF THE INVENTION

Figure 1:
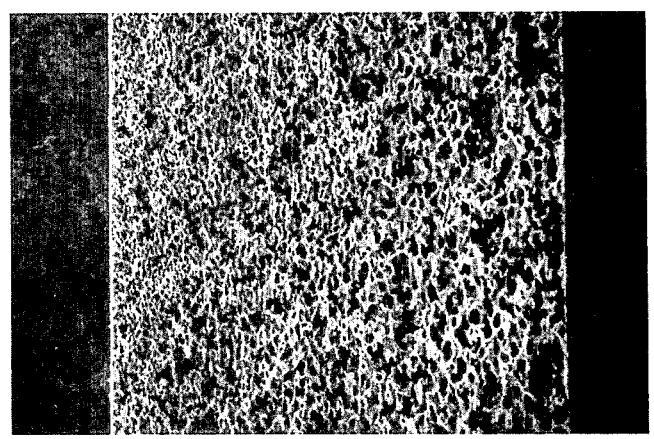
FIG. 1 is an electron micrograph at a magnification of 240, showing a cross-sectional structure of a membrane comprising a uniform microporous structure according to the invention as prepared in Example 1. Micropores of an average size of 5 microns are found arranged uniformly throughout the whole section.
Figure 2:
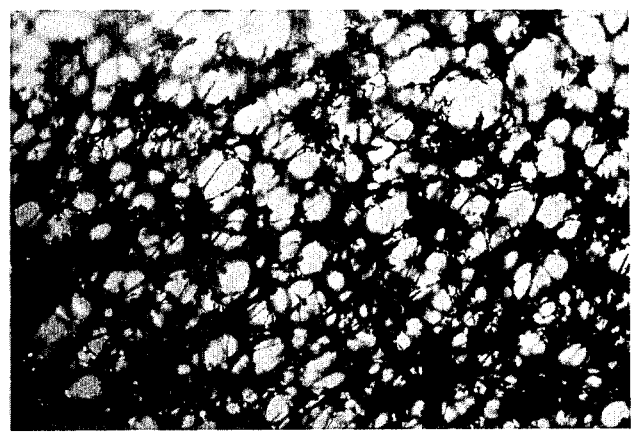
FIG. 2 is an optical micrograph at a magnification of ×100, showing a cross-sectional structure of a sponge formed by a process comprising mixing PVA and starch, forming the sponge and removing the starch by extraction. Micropores of 10-100 microns are found distributed in the body. It is clear that the membrane of the present invention (FIG. 1) has a more uniform microporous structure than the sponge of FIG. 2.

The membranes of the present invention have a porosity (pore volume) of at least 60%. Membranes having a desired porosity can be produced by forming membranes (in any shape, e.g., flat membranes, tubular membranes or hollow fiber membranes) from a PVA solution containing fine silica particles by the conventional wet and/or dry coagulation methods, followed by treating the membranes with an alkali solution so that the silica may be dissolved and removed. Accordingly, the porosity is closely related to the silica content and the extent of removal thereof. If the porosity is less than 60%, the membrane will not afford high permeability. Porous membranes made by extraction of micropore-forming materials and having low porosity values generally have a possibility that the micropores are not connected with one another to form open cells but become closed cells. Since the non-interconnecting micropores cannot become passages for the fluid passing through the membrane, high permeability cannot be obtained. For that reason, the porosity has a great influence on the permeability of the membrane of the present invention, and it is necessary that the porosity is at least 60%, preferably at least 70%, so that the membrane may have a practically useful permeability.

By way of example, the relationship between the porosity and the water permeability is shown in Table 1 for membranes having an average pore size of 1 micron (as determined by the mercury penetration method). It can be seen that those membranes which have porosities less than 60% show markedly decreased permeability values.

TABLE 1

Porosity and permeability of membranes having an average pore size of 1 micron

| Porosity (%) | 35 | 47 | 51 | 63 | 82 |
|---|---|---|---|---|---|
| Water permeability (liters/hr . atm . m$^2$) | ca 1 | ca 1 | 7 × 10 | 6 × 10$^3$ | 1.2 × 10$^4$ |

Silica, which is used according to the present invention, is easily rendered soluble in alkali solutions such as lithium hydroxide, sodium hydroxide, potassium hydroxide and the like; whereas, PVA is very stable when exposed to alkalis. Therefore, upon treating the silica-containing membrane with an aqueous alkali solution, the silica is extracted without any influence upon the PVA. Since PVA is hydrophilic and water swellable, silica, which is in the inner part of the membrane, can also be dissolved out easily. In order to avoid possible dissolution of silica during the use of the membrane and also to attain a high porosity, it is desirable to substantially remove silica, i.e. to an extent of at least about 90%, preferably at least about 99%.

The membrane according to the present invention mainly consists of PVA, consequently it has such characteristics as resistance to microorganisms as well as to chemicals, and can be used, for example, as an ultrafiltration membrane or as a filtration membrane.

The "pore size" as used herein is determined with the pore size distribution curve prepared by the mercury penetration method, and by observations with an electron or an optical microscope.

The porosity can be determined by the following formula:

$$(1 - \rho_a/\rho_b) \times 100 (\%)$$

wherein $\rho_a$ is the apparent density of the porous membrane and $\rho_b$ is the density of a membrane having no pores or voids.

The present invention further provides a method of producing a semi-permeable PVA membrane, which comprises preparing a PVA composition containing fine silica particles having an average particle size of 50 Ångstroms to 10 microns in an amount of 50–500 parts by weight per 100 parts by weight of PVA, adjusting the particle size of said silica by aggregating at least a portion of said silica in said composition, coagulating said composition in a coagulation bath, and removing the silica particles from the resultant membrane by extraction during and/or after the coagulation.

In the production of porous membranes by a process comprising blending a pore-forming material with a polymer and extracting the pore-forming material after the membrane is formed (this method hereinafter being called the "extraction method"), it is very important to use a proper pore-forming material and a polymer solution in which the pore-forming material can be very finely dispersed, since the performance of the resultant membrane is mostly governed by the sizes of the pore-forming material and the extent of the dispersion thereof in the polymer solution. More particularly, if a pore-forming material having a non-uniform particle size is used, the resulting porous membrane will not have a narrow pore size distribution. If the extent of dispersion of the pore-forming material is not good, only membranes having poor permeability characteristics can be obtained. In cases where the pore-forming material is largely aggregated or decomposed during the membrane formation, it is difficult to attain a narrow pore size distribution in the membrane or it may become necessary to strictly control the conditions of membrane formation and accordingly the membrane formation will become less stable.

Further, it is important in practicing the extraction method that the pore-forming material can be extracted to a satisfactory extent. In other words, membranes with good permeability can be obtained only by employing such a solvent as neither dissolves the polymer nor destroys or alters the porous structure but can dissolve or extract easily only the pore-forming material.

It is one of the disadvantages of the known extraction methods that satisfactory extraction of the pore-forming material is generally difficult due to inclusion or concealment of the pore-forming material by the polymer. The known extraction method generally results in a broad pore-size distribution in the membrane as compared with the solvent evaporation method.

Colloidal silica having an average particle size ranging from 10 to 1000 Angstrom units and a uniform particle size distribution is available, and it has now been found that porous PVA membranes can be manufactured by using said fine silica particles together with PVA. Since colloidal silica is obtained as a dispersion of colloidal particles in water, the compatibility with PVA, which is a water-soluble polymer, in water is excellent. Therefore, it can be dispersed so uniformly in PVA solution that porous membranes with excellent pore-size uniformity are obtained. Further, the good compatibility makes it possible to increase the amount of silica added thereto so that porous membranes with a high porosity and excellent permeability characteristics can be produced.

The colloidal silica to be used in the invention can be the usual aqueous dispersion thereof, and any particle size may be employed depending on the ultimate use of the membrane. However, in view of the stability of the aqueous dispersion, particle sizes of 50–1000 Ångstroms, especially 70–500 Angstroms, are preferred. It is also possible to use a mixture of two or more kinds of colloidal silica having different particle sizes for certain purposes.

Silica powder (silica in a gel form), consists of single silica particles having relatively uniform sizes in the range of about 0.005–10 microns. These particles may form secondary particles resulting from aggregation of single particles, and the sizes of said secondary particles can range from about 0.1 to 50 microns. These secondary particles also exhibit a relatively uniform particle size distribution.

Since the silica powder forms a uniform suspension in water, a uniform mixture can be prepared by mixing PVA or an aqueous solution thereof with an aqueous suspension of silica powder. When the concentration of silica powder in the aqueous suspension exceeds about 20%, however, the viscosity increases significantly and sometimes it becomes difficult to uniformly mix the silica powder with PVA and to incorporate a large amount thereof into the PVA as compared with the colloidal silica. In such a case, the silica powder is directly introduced into the aqueous PVA solution mixing the two in a static mixer or a line mixer. When a PVA solution consists of a nonaqueous solvent such as dimethyl sulfoxide, colloidal silica cannot be used directly because of its being dispersed in water, but advantageously silica powder can be added to and mixed with said PVA solution.

The amount or content of silica particles to be used is 50–500 parts by weight, preferably 80–300 parts by weight, per 100 parts by weight of PVA.

If the amount is less than 50 parts by weight on PVA the porosity of the membrane becomes low and the pores in the membrane tend to become closed cells, so that satisfactory permeability characteristics cannot be obtained. Conversely, if the amount exceeds 500 parts by weight, the porosity becomes too high and sufficient membrane strength cannot be obtained any more, and the membrane is not suitable for the intended uses.

The particle size of the silica in the PVA-silica composition obtained by the above procedure is adjusted by permitting at least a part of the silica in said composition to aggregate. If the silica added to the PVA composition does not aggregate at all and remains in the membrane in its original particle size, the size of the micropores in the membrane will naturally approximate the particle size of the silica initially used.

However, if the silica added is too small in particle size and extracted as it is, the resulting microporous structure of the membrane often has too small pores which are not desirable for certain uses. Controlling the particle size of the silica added is thus one of the important factors directly governing the structure and performance of the resulting membrane.

The present inventors have found that controlling or adjusting the particle size of the PVA-silica composition can be easily effected.

In preparing the PVA-colloidal silica composition, a small amount of aluminum ion, an amine, a cationic surfactant, or an alcohol (e.g. glycerol) can be added so as to stabilize the sol state of the colloidal silica. On the other hand, the aggregation or gelation of colloidal silica can be attained in the following manner. The stability of colloidal silica is known to depend, to a great extent on the pH. Thus, when a colloidal silica which is stable under basic conditions is used, it can be aggregated by adjusting the pH of the composition to an acidic pH and a membrane having larger pores as a result of the aggregation of colloidal silica can be obtained.

Addition of a salt such as NaCl or $Na_2SO_4$ is also effective in causing aggregation of colloidal silica. It is also possible to control aggregation of colloidal silica by altering or properly selecting the order of mixing of PVA and colloidal silica, the proportion thereof, the concentrations thereof, the temperature of mixing, the period of time for mixing, and the addition of a third component other than those mentioned previously. The stabilization and aggregation of silica powder contained in the PVA composition can also be effected in the same manner as in the case of colloidal silica. Generally, when particles are allowed to aggregate, the uniformity of pore size distribution decreases. In the present invention, however, employing the methods described above, membranes with unexpectedly narrow pore-size distribution are obtained.

The polyvinyl alcohol (PVA) to be used in the present invention includes various grades of polyvinyl alcohol having an average polymerization degree of 500–3500 and a saponification degree of 85–100 mol %, copolymers thereof (including block copolymers and graft copolymers) with such a comonomer or comonomers as ethylene, vinyl pyrrolidone, vinyl chloride, methyl methacrylate, acrylonitrile and itaconic acid in a quantity of less than 10 wt. %, and further derivatives of polyvinyl alcohol and copolymers thereof, such as the partially acetalized derivatives.

Because an extraction method is employed in the present invention and because silica, an inorganic substance, is essentially stable thermally and chemically, such strict control of the conditions in the coagulation of the membrane as required in the case of the solvent evaporation method is not necessary, but it is sufficient that PVA alone is coagulated to a sufficient extent during the coagulation step. Therefore, the preferred conditions can be obtained very easily, and thus the method of the present invention has an important advantage in that uniform membrane performance can be obtained with good reproducibility.

The liquid composition can be coagulated either by the conventional wet or dry method or by a combination of both the methods. However, a higher rate of coagulation is desirable for fixing the state of dispersion of colloidal silica in PVA, and in this respect and also because of easiness of membrane formation, the wet method is preferred.

The membrane formation mentioned herein includes not only formation of membranes in the flat form but also formation of membranes in the form of hollow fiber membranes by means of spinning known per se. When the hollow fiber membrane is manufactured, a suitable fluid is introduced into the spun fiber through the central aperture of an annular nozzle. Said suitable fluid includes inert gas e.g. air and nitrogen gas, coagulating gas e.g. ammonia, non-coagulating liquid e.g. n-hexane and coagulating liquid e.g. aqueous alkaline solution, aqueous dehydrating solution and a mixed solution thereof.

The wet coagulation of PVA is usually carried out by any of the following procedures: (1) the method comprising extruding an aqueous PVA solution into an aqueous solution of a dehydrating salt such as sodium sulfate, (2) the method comprising extruding an aqueous PVA solution into an aqueous alkali solution such as caustic soda, (3) the method comprising extruding an aqueous PVA solution containing boric acid or a salt thereof into an aqueous alkaline solution of a dehydrating salt such as an aqueous solution of caustic soda and sodium sulfate, and in present invention, any of said methods can be employed. As usual, the membrane after the coagulation is subjected to stretching or drawing between rollers, neutralization, application of a salt solution and other steps. If necessary, washing, wet heat stretching or wet heat treatment may be carried out.

Hollow fiber membrane is the preferable product to other shaped membranes from the practical point of view, and it can be manufactured by any of said procedures (1), (2) and (3). The present inventors have found that coagulation rates in the procedures (1), (2) and (3) under the conventional conditions are rather slow, and the hollow fiber membrane thus prepared has said uniform microporous structure. These conventional procedures are not always satisfactory, since the hollow fiber membrane is manufactured continuously and at a relatively high speed and accordingly requires a fast coagulation rate.

By study of the present inventors, it is found that PVA composition containing fine silica particles and a boric acid or a water soluble salt thereof in a large amount of 5 to 30%, more preferably 6 to 20%, based on the weight of PVA, and an aqueous coagulating solution containing an alkali in a relatively small amount of 0.5 to 250 g/l, more preferably 1 to 150 g/l, and a dehydrating salt in a saturated amount to the solution give a sufficiently fast coagulation rate to the hollow fiber production. The hollow fiber membrane prepared by above conditions has such structure comprising a uniform microporous layer and a supporting layer with vacuoles as previously stated. This is one of the unexpected results in the present invention.

The second of the important features of the present invention consists in that the silica is dissolved and extracted from the membrane with an alkali solution during and/or after the coagulation of the composition.

It is a matter of course that the membrane which still contains the silica cannot show satisfactory permeability, hence extraction of the silica to a sufficient extent is essential to formation of a porous structure.

Silica particles are inorganic substances which are generally stable thermally and chemically. However, such particles are very poor in resistance to alkalis and are dissolved in alkali solutions.

PVA, however, is excellent in its resistance to alkalis, as is well known in the art. PVA does not undergo destruction of its structure in alkali solutions even under severe conditions, but sometimes is instead rather stabilized. The present invention thus involves the use of alkali solutions as extraction solvents which are inert to PVA as the membrane-forming material, but easily dissolve the pore-forming material, i.e. silica.

The conventional extraction methods have a drawback that sufficient extraction of the pore-forming material is difficult. In the present invention, however, it is possible to dissolve and extract silica particles to a satisfactory extent under severe conditions which still do not adversely affect the PVA.

Such alkalis as NaOH, KOH and LiOH may be used. The solvents for said alkalis may include water and alcohols such as methanol and ethanol. In view of good solubility and ease of handling, water is preferred.

Extraction of the silica can be effected by immersing the membrane in the above-mentioned alkali solution. The rate of extraction depends upon the alkali concentration and the temperature of the solution. The higher the concentration and the temperature, the greater the rate of extraction.

When an aqueous NaOH solution is used, its concentration is preferably at least 5%, and preferably at least 10%, so that the extraction time can be shortened. The extraction temperature is preferably at least about 40° C. and preferably at least about 60° C. By properly selecting the extraction conditions, for example, 99% or more of the silica component can be removed by extraction within an hour. After the extraction of silica, it is preferable to wash away the alkali or silica with or without neutralizing the adsorbed alkali with an acid.

The porous membrane according to the present invention can be subjected to heat treatment or crosslinking treatment at a step after the coagulation membrane formation or before or after extraction of silica so that the membrane is improved in its mechanical strength and resistance to heat. Such a treatment is most preferably carried out before the extraction because the PVA and the state of dispersion of the silica in PVA can be fixed to a further extent by the treatment. Said crosslinking treatment includes intermolecular crosslinking with glutaraldehyde, glyoxal or the like, intramolecular acetalization with formaldehyde, acetaldehyde or the like and a combination thereof.

The wet membrane so prepared may be used as it is. The wet membrane may be dried by air drying, substitution with an organic solvent, or freeze drying.

According to the present invention, membranes having average pore sizes of from about 50 Angstroms to about 50 microns with narrow pore-size distribution and having excellent water permeabilities of 1 to $10^5$ liters/hr.atm.m$^2$ can be obtained.

According to the present invention, a flat membrane has a thickness of 5 to 2,000 microns, more preferably 10 to 1,000 microns, and a hollow fiber membrane has an outer diameter of 50 to 5,000 microns and a thickness of 10 to 4,000 microns.

Basically, the membrane of the present invention consists of a polyvinyl alcohol polymer alone, hence it is resistant to bacteria and chemicals. Moreover, this membrane is excellent in its narrow pore-size distribution and in permeability characteristics. For these reasons, it can be used as a membrane for separation purposes in various fields.

The following examples will illustrate the invention in more detail.

EXAMPLE 1

A homogeneous aqueous composition having a PVA concentration of 10% and an $SiO_2$ concentration of 140% by weight based on PVA was prepared by mixing colloidal silica (Snowtex-30, product of Nissan Chemical Industries, Ltd., pH 10, particle sizes 100–200 Angstroms) with PVA having a saponification degree of 98.5% and an average polymerization degree of 2400, adjusting the pH to 5.0 and heating the mixture at 100° C. to cause dissolution. This composition was extruded through a slit die into a coagulation bath (aqueous solution containing 400 g/l of $Na_2SO_4$) at 55° C. to give a membrane. The membrane was subjected to crosslinking treatment by immersing the same in a treatment bath (glutaraldehyde/$H_2SO_4$/$Na_2SO_4$=3/30/200 g/l) at 70° C. for an hour and then to a silica extraction treatment by immersing the membrane in 300 g/l NaOH at 90° C. for an hour. Thereafter, the membrane was neutralized with an aqueous solution of HCl (1%) and washed with running water.

Figure 3:
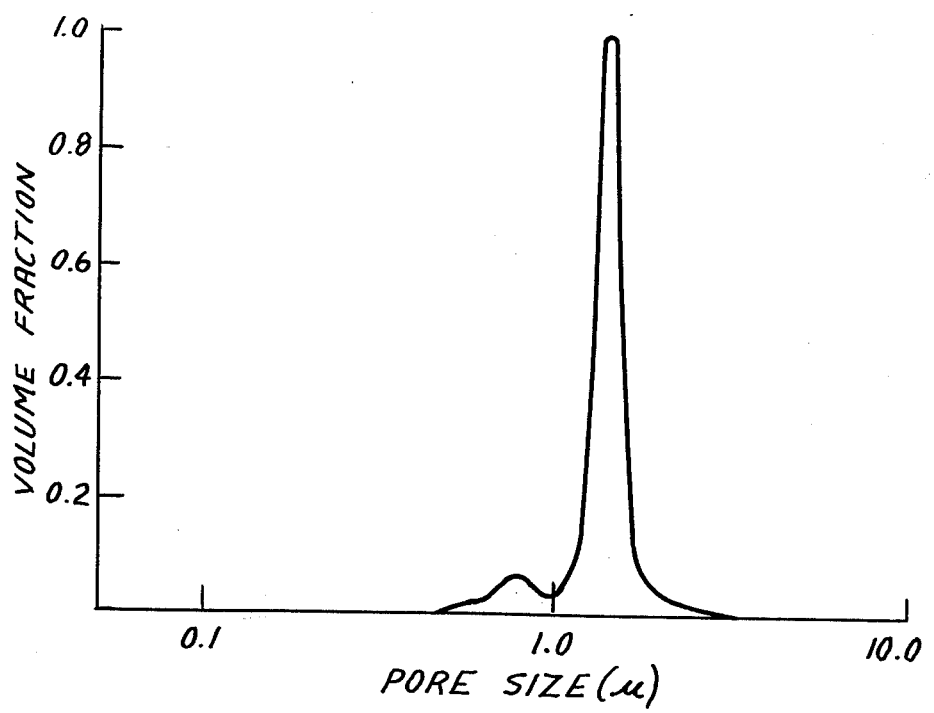
FIG. 3 is a pore size distribution curve for the membrane obtained in Example 1. The pore size measurement was made by the mercury penetration method.
Figure 4:
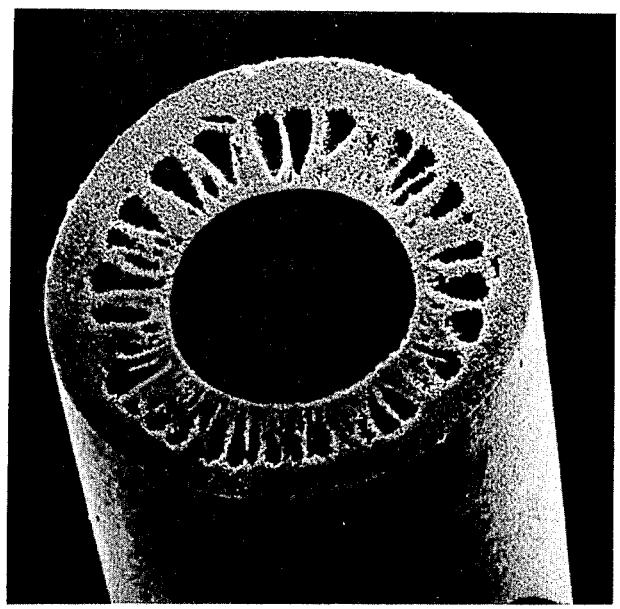
FIG. 4 is an electron micrograph at a magnification of 60, showing a circular cross-sectional structure of a hollow fiber membrane which is another embodiment of the present invention. A uniform microporous layer is formed in the radially outward portion existing about 40 to 50% of the whole thickness of the membrane, and a supporting layer is formed also in the radially inward portion comprising a plurality of vacuoles and existing about 60 to 50% of the whole thickness.

Observation of the membrane so obtained under an electron microscope revealed that it was a porous membrane having uniform micropores of an average pore size of 5 microns (FIG. 1). FIG. 3 represents the pore-size distribution curve for this membrane obtained by mercury porosimeter. This is a very narrow curve with a peak at 1.5 microns, showing a very uniform pore-size distribution.

The rate of water permeability was $1.2 \times 10^4$ liters/hr.atm.m$^2$. Colorimetric analysis gave a silica content in the membrane of 0.1% (based on PVA) and revealed that the silica had been removed almost completely. The porosity was 77%.

EXAMPLE 2

A homogeneous aqueous solution containing 10% of PVA and 140% (based on PVA) of colloidal silica was prepared by mixing colloidal silica (Snowtex OL, pH 3, pore size 450 Angstroms), PVA having a saponification degree of 98.5% and an average polymerization degree of 2400 and $H_3BO_3$ (1% based on PVA) and heating the mixture at 100° C. to cause dissolution. This solution was extruded through an annular nozzle into a coagulation bath (25 g/l NaOH, 320 g/l $Na_2SO_4$) to give a hollow fiber. The fiber was subjected to the same crosslinking and silica extraction treatments as in Example 1.

Observation of the cross section of the hollow fiber obtained with an electron microscope revealed that the porous membrane had uniform micropores of sizes of 0.1–0.2 micron.

Water permeability was $3 \times 10^2$ liters/hr.atm.m$^2$. The silica content in the membrane was 0.2%, which proved almost complete removal of the silica. The porosity was 63%.

EXAMPLE 3

A homogeneous aqueous solution containing 10% of PVA and an SiO$_2$ of 100% by weight based on said PVA was prepared by mixing a silica powder (Finesil, product of Tokuyama Soda Co., Ltd., average size of secondary particles 1.5 microns) with PVA having a saponification degree of 98.5% and an average polymerization degree of 2400 and heating the mixture at 100° C. to cause dissolution. This solution was extruded through a slit die into a coagulation bath (aqueous solution of 400 g/l Na$_2$SO$_4$) at 55° C. The membrane thus obtained was immersed in an aqueous NaOH solution (350 g NaOH/liter) at 95° C. for an hour so as to extract the silica.

Observation of the product membrane with an electron microscope revealed that the membrane was porous and had pores of a very uniform size of 2 microns.

The water permeability was 20,000 liters/hr.atm.m$^2$. The silica content in the membrane was 0.3%. The porosity was 82%.

EXAMPLE 4

A homogeneous aqueous solution containing 8% of PVA and 140% based on PVA of colloidal silica was prepared by mixing colloidal silica (Snowtex-30), PVA having a saponification degree of 98.5% and an average polymerization degree of 2,400 and boric acid (10% based on PVA), adjusting the pH to 5.0 and heating the mixture at 100° C. to cause dissolution. This solution was extruded through an annular nozzle into a coagulation bath (NaOH of 5 g/l and Na$_2$SO$_4$ of 320 g/l) to give a hollow fiber. The fiber was subjected to the same crosslinking and silica extraction treatments as in Example 1.

Outer diameter of the hollow fiber was 1,400 microns, inner diameter was 600 microns and thickness of the membrane was 400 microns. Observation of the cross-section of hollow fiber obtained with an electron microscope revealed that the porous membrane had a uniform microporous layer comprising micropores of 5 microns in the radially outward portion existing about 50 to 40% of the whole thickness and a supporting layer in the radially inward portion comprising a plurality of vacuoles and existing about 50 to 60% of the whole thickness. Ratio of l/r was 40 to 50. Water permeability was 5,000 l/hr.atm.m$^2$. The silica content in the membrane was 0.2%. The porosity was 85%.

What is claimed is:

1. A polyvinyl alcohol (PVA) microporous membrane having a porosity of at least 60% and prepared by a process which comprises preparing a PVA composition containing therein fine silica particles with an average particle size of from 50 Ångstrom units to 10 microns in an amount of from 50 to 500 parts by weight per 100 parts of PVA, optionally adjusting the particle size of said silica by aggregating at least a portion of the silica in the composition, coagulating said composition in a coagulation bath to form a PVA membrane, and substantially extracting said silica particles from said membrane, thereby forming a PVA membrane with a microporous layer of controlled uniform pore size, which comprises a plurality of micropores with an average diameter (r) of 0.01 to 50 microns and exists in (1) either the whole thickness of the membrane or (2) in from 80 to 20% of the whole thickness of the membrane with a supporting layer which comprises a plurality of vacuoles with an average longitudinal length (l) of more than 10 microns being the remainder of the whole thickness of the membrane, wherein the ratio of l/r is at least 5.

2. A polyvinyl alcohol microporous membrane as defined in claim 1 wherein at least about 90% of said silica particles are extracted therefrom.

3. A polyvinyl alcohol microporous membrane as defined in claim 2 wherein at least about 99% of said silica particles are extracted therefrom.

4. A polyvinyl alcohol microporous membrane as defined in claim 1 wherein the micropores formed therein exhibit an average diameter of 0.05 to 20 microns.

5. A polyvinyl alcohol microporous membrane as defined in claim 1 wherein the membrane has a porosity of at least 70%.

6. A polyvinyl alcohol microporous membrane as defined in claim 1 wherein said fine silica particles are present in the membrane, prior to extraction, in an amount of 80 to 300 parts by weight per 100 parts by weight PVA.

7. A polyvinyl alcohol microporous membrane as defined in claim 1,2,3,4,5 or 6 wherein the PVA membrane comprises a plurality of uniform micropores therein with an average diameter of 0.01 to 50 microns.

8. A polyvinyl alcohol microporous hollow-fiber membrane as defined in claim 1, 2, 3, 5 or 6 wherein the PVA membrane comprises a uniform microporous layer comprising a plurality of micropores with an average diameter (r) of 0.01 to 50 microns and existing in 80 to 20% of the whole thickness of the membrane and a supporting layer comprising a plurality of vacuoles with an average longitudinal length (l) of more than 10 microns and existing in 20 to 80% of the whole thickness of the membrane, and the ratio of l/r is at least 5.

9. A method for preparing a semi-permeable polyvinyl alcohol (PVA) membrane which comprises preparing a PVA composition containing fine silica particles having an average particle size of 50 Angstrom units to 10 microns in an amount of 50 to 500 parts by weight per 100 parts by weight of PVA, optionally adjusting the particle size of said silica by aggregating at least a portion of the silica in the composition, coagulating said composition in a coagulation bath to form a PVA membrane and substantially extracting the silica particles from the resultant membrane with an aqueous or alcoholic alkali solution during and/or after the coagulation of said membrane, thereby obtaining a plurality of micropores of controlled uniform size with an average diameter of 0.01 to 50 microns.

10. A method as defined in claim 9 wherein at least about 90% of said silica particles are extracted from said membrane.

11. A method as defined in claim 9 wherein the silica particles are colloidal silica and the particle size thereof ranges from 0.005 to 0.1 micron.

12. A method as defined in claim 9 wherein the silica particles are silica powder and the particle size thereof ranges from 0.005 to 10 microns.

13. A method as defined in claim 9 wherein the particle size of said fine silica particles is adjusted by effecting aggregation of at least a portion of said particles in said composition.

14. A method as defined in claim 9 wherein the fine silica particles are colloidal silica and, with aggregation thereof inhibited, a plurality of micropores are formed in the membrane having an average diameter of 0.01 to 1 micron.

15. A method as defined in claim 14 except that aggregation is effected resulting in the formation of a membrane containing a plurality of micropores having an average diameter of 0.1 to 50 microns.

16. A method as defined in claim 15 wherein aggregation is effected by adjusting the pH of the PVA composition to an acidic pH.

17. A method as defined in claim 16 wherein a PVA composition containing fine silica particles and a boric acid or a water-soluble salt thereof in an amount of 5 to 30% based on the weight of PVA is prepared and said PVA composition is coagulated in a coagulation bath containing an alkali in an amount of 0.5 to 250 g/l and a dehydrating salt.

18. A method as defined in either of claim 15 or 16 wherein aggregation is effected by addition of NaCl or $Na_2SO_4$ to the PVA composition.

19. A method as defined in claim 18 wherein a PVA composition containing fine silica particles and a boric acid or a water-soluble salt thereof in an amount of 5 to 30% based on the weight of PVA is prepared and said PVA composition is coagulated in a coagulation bath containing an alkali in an amount of 0.5 to 250 g/l and a dehydrating salt.

20. A method as defined in claim 9 wherein the fine silica particles are silica powder and, with aggregation thereof inhibited, a plurality of micropores are formed in the membrane having an average diameter of 0.01 to 10 microns.

21. A method as defined in claim 20 except that aggregation is effected resulting in the formation of a membrane containing a plurality of micropores having an average diameter of 0.1 to 50 microns.

22. A method as defined in claim 9, 10, 11, 12, 13, 14, 15, 20 or 21 wherein a PVA composition containing fine silica particles and a boric acid or a water-soluble salt thereof in an amount of 5 to 30% based on the weight of PVA is prepared and said PVA composition is coagulated in a coagulation bath containing an alkali in an amount of 0.5 to 250 g/l and a dehydrating salt.

* * * * *